Jan. 13, 1948.     H. M. MARC     2,434,466
COMPOSITE BOARD
Filed May 23, 1944

INVENTOR
Henri M. Marc
BY
Kenyon & Kenyon
ATTORNEYS

Patented Jan. 13, 1948

2,434,466

UNITED STATES PATENT OFFICE 2,434,466

COMPOSITE BOARD

Henri M. Marc, Cincinnati, Ohio, assignor to The Philip Carey Manufacturing Company, a corporation of Ohio Application May 23, 1944, Serial No. 536,860

8 Claims. (Cl. 154—45.9)

This invention relates to composition board and board-like products. It relates especially to composite board fabricated from a plurality of plies of sheet material adhesively bonded together into an integral rigid board-like material.

Fabricated composite boards of the character aforesaid have been made heretofore from a plurality of fibrous sheets by applying adhesive material to the sheet and disposing the sheets face to face in a plurality of layers, the adhesive bonding the layers together and becoming hardened to form a composite board comprising the integrally bonded layers. When heat- and moisture-resistance are desired the fibrous sheet materially generally consists either substantially entirely, or very largely, of asbestiform mineral fibers.

When sodium silicate is used as an adhesive for bonding together the layers of composite board, the sodium silicate is applied in water solution and subsequently is dried. Upon drying the sodium silicate forms a hardened, horn-like or glassy mass which is in the nature of a hardened silica gel. However, if the composite material bonded by the hardened silicate is moistened, or otherwise subjected to water, the silica gel, being in the presence of the alkali, becomes redispersed and goes back into solution. For this reason composite board-like materials fabricated from sodium silicate as the bonding material for the plies or layers in the product, are deficient in resistance to moisture and to water and have very low, if any, wet strength.

It has heretofore been proposed to insolubilize sodium silicate, when used for adhesive purposes, by means of Portland cement. Portland cement, and particularly the lime compounds contained therein, have the property of reacting with the sodium silicate and forming insoluble silicates and precipitated silica or silica gel. However, a considerable quantity of Portland cement is required to effect the insolubilization of the sodium silicate. In the use of Portland cement to insolubilize sodium silicate, one is presented with certain difficulties, the principal one being that if enough Portland cement is employed to render the sodium silicate sufficiently insoluble to afford board-like products of high wet strength, the quantity of Portland cement that is required is so great that the Portland cement-sodium silicate mixture becomes of a mortar-like consistency which is incapable of satisfactory application as an adhesive, which affords a very poor bond with surfaces to which it is applied, and which sets so rapidly that it becomes unworkable before it can be applied to the surfaces of sheet materials comprised in the board-like product to be manufactured.

It is a purpose of this invention to overcome difficulties of the character aforesaid, and to provide board-like products of the type herein under consideration which have high strength when dry and which otherwise have high wet strength. It is a further purpose of this invention to provide board-like products which have high strength, both when dry and when wet, and which can be manufactured utilizing relatively low curing temperatures. It is a further purpose of this invention to provide board-like products which are easily manufactured, in that the cementitious bonding material is readily applied, has a good initial and permanent bond with surfaces to which it is applied, can be more rapidly dried than other inorganic adhesive compositions, and minimizes the production of blisters and air pockets in the finished article.

I have found as a result of my research that while compounds of sodium and potassium are commonly regarded as equivalents, the silicates of sodium and of potassium have decicedly different characteristics and properties affecting their suitability for use in the fabrication of board-like products of the character referred to herein. In fact, potassium silicate by itself is not suitable as the base for the cementitious compositions used in the manufacture of such board-like products due principally to the fact that it has very poor adhesive properties when used alone and is so readily absorbed into bibulous sheet materials that it does not form a film at the interface between plies of such material that is capable of forming an effective adhesive bond.

I have further found as a result of my research that the hardening of potassium silicate occurs very much differently than the hardening of sodium silicate. When an alkali silicate hardens, the alkali silicate forms a hard, horn-like mass that is believed to be composed principally of silica gel. In the case of sodium silicate the hardened silica gel thus formed is, as hereinabove stated, quite readily redispersible in water. When, on the other hand, the hardened silica gel is formed from potassium silicate, it is much more resistant to redispersion in water. Moreover, in the hardening of an alkali silicate by heat curing, sodium silicate is much more difficult to insolubilize, and even when relatively high curing temperatures of the order of 900° to 1000° F. are employed, the insolubilization of the sodium silicate is not particularly effective. Such high curing temperatures are, of course, much too high for use in connection with boardlike products which contain a substantial quantity of organic material either in the form of organic fibers, such as cellulosic fibers, or in the form of an organic binder, e. g., starch. Most organic materials are subject to gradual decomposition at temperatures of about 250° F. and char and smoke when heated above 300° F. At temperatures of 350° F. smoking and carbonization occur, and at 400° F. or higher the charring action and combustion are very rapid. Moreover, noxious fumes are given off and in some cases the fumes may be combustible or even explosive and present a serious fire hazard. Even in the case of cementitious bodies, e. g., asbestoscement boards or the like, the cement is seriously impaired by exposure to temperatures of the order of 750° F. or higher.

I have found that potassium silicate, unlike sodium silicate, can be hardened and insolubilized by heat curing at relatively low temperatures. Thus, when temperatures as low as 200° to 300° F., which are not harmful to products containing organic material, are used in heat curing, pronounced insolubilization of potassium silicate is effected.

While either sodium silicate or potassium silicate, per se, has disadvantages for use in the manufacture of composite board-like products, I have found that such disadvantages can be overcome by utilizing sodium silicate and potassium silicate in admixture provided the ratio of potassium silicate to sodium silicate is maintained within certain limits, and provided further that the mixed sodium silicate and potassium silicates are employed in proper ratio to the other ingredients of the adhesive composition, the ratio of the alkali silicate to the insolubilizing agent in the composition being of particular importance.

In the cementitious bonding material that is employed in the manufacture of composite boardlike products according to this invention, it is important that the potassium silicate be used in such proportion relative to the sodium silicate that it constitutes from 10% to 75% by dry weight of the total alkali silicate. It is preferable that the potassium silicate constitute from 15% to 60% by dry weight of the total alkali silicate.

The alkali silicate that is used may be ordinary commercial grade. One widely sold sodium silicate is a 42° Bé. solution containing about 38.2% of solids, the ratio of $Na_2O$ to $SiO_2$ being about 1 to 3.2. Potassium silicate is of much less common commercial occurrence than sodium silicate. However, it can be obtained on the market, and one such solution is a 28° Bé. solution containing about 27.3% of solids, the ratio by weight of $K_2O$ to $SiO_2$ being about 1 to 2.5. While the solutions of alkali silicates which have been mentioned as typical are suitable, other alkali silicate solutions of varying concentrations and of varying ratios of alkali to silica may be used. It is ordinarily preferable, however, that in the mixed alkali silicate the ratio of $Na_2O$ plus $K_2O$ to $SiO_2$ be between about 1 to 2.5 and about 1 to 3.5. If the silicate is more alkaline, insufficient insolubilization is afforded while, if it is less alkaline, the adhesive composition precipitates prematurely.

In combination with the mixed alkali silicates I use, as an insolubilizing agent therefor, a calcareous hydraulic cement. Ordinary Portland cement may be used for this purpose. An especially suitable Portland cement is one which is prepared from selected raw materials low in iron content that tends to cause discoloration. Another hydraulic cement which is suitable is a commercial product which is prepared by intergrinding about equal parts of light colored Portland cement and marble chips. In general the ordinary Portland cements which are relatively slow setting are preferable to the special quick-setting or high-early-strength varieties of Portland cement.

Another hydraulic cement that is suitable is aluminous cement which consists principally of calcium aluminate. It is prepared from limestone and bauxite by heating these materials together until they become reduced to a fused mass (as distinguished from merely fritting or sintering) and then casting the resulting fused materials which form, upon cooling, a compact, hard and basalt-like mass that is subsequently crushed and ground. This type of cement is often referred to as fused cement or electrofused cement. Aluminous cement is of very dark color and this fact makes its use less desirable when light color is desired. While aluminous cement contains a relatively large proportion of aluminum compounds, it also contains a relatively large proportion of calcium compounds and therefore is to be regarded as a calcareous cement as the term is used herein and in the claims.

The amount of calcareous hydraulic cement that is employed in combination with the mixed sodium and potassium silicate is such that the ratio of alkali silicate to calcareous hydraulic cement is between about 4 to 3 and about 1 to 2.5, and it is preferred that such ratio be between about 1 to 1 and about 1 to 1.5.

The calcareous hydraulic cement acts upon the mixed potassium and sodium silicate so as to cause the mixed silicate materials and cement to set up after the manner of setting of hydraulic cements but somewhat more rapidly, the rate of setting up depending upon the type of cement that is employed. Thus regular Portland cement causes the mixture to set up quite rapidly. When it is desired to delay the setting up of the mixture and thereby afford a longer interval of time during which the cementitious bonding material remains workable and retains its adhesive consistency, a suitable retarder may be employed such as tri-sodium phosphate or sodium fluoride or a mixture of these materials. Tri-potassium phosphate is also suitable. In the usual case it is preferable to employ a combination of tri-sodium phosphate and sodium fluoride (the corresponding potassium salts may be substituted for either or both of these materials), since such combination is more effective than the individual retarders by themselves. In addition to the foregoing, other materials such as certain sugars serve to retard the setting of the alkali silicate-cement mixtures and any suitable retarder may be employed if it is desired to extend the working life of the cementitious bonding material so as to facilitate its application to the surfaces of the sheet materials to be bonded together in the manufacture of composite board-like products.

With regard to aluminous cement, its effect in reacting with the alkali silicate is more gradual, and no especial advantage is to be gained from employing a retarder therewith unless an exceptionally long working life of the cementitious bonding material is desired. This comment is likewise applicable to other fused cements (as distinguished from fritted cements). More generally, employment of a retarder is not essential in the practice of this invention.

The cementitious bonding material, as applied in the manufacture of composite board-like products according to this invention, ordinarily consists predominantly of the solution of the mixed sodium and potassium silicate plus the calcareous hydraulic cement, the amount of other ingredients being small. However, inert filler materials such as fine sand, calcium carbonate, silica flour, slate flour, fly ash and the like may be employed. However, of the total solids in the cementitious bonding material, about 30% to about 50% by dry weight and preferably approximately 35% to 40% by dry weight should consist of alkali silicate, thereby affording a high degree of adhesiveness and good bonding with the surfaces to which the bonding material is applied.

There is one type of filler material, namely, clays, that has special advantages for use in cementitious bonding material, since the insolubilization of the alkali silicate is more complete when it is insolubilized in the presence of a substantial amount of clay. In fact, a fairly high degree of insolubilization can be afforded merely by the action of the clay and without employment of any other insolubilizing agent such as a calcareous hydraulic cement. The insolubilization that is afforded by the presence of clay is attained when the composite lumber, after initial fabrication and drying, is heated, the heating in the presence of clay effecting an improved curing and insolubilization of the alkali silicate. The clay is likewise beneficial in the cementitious bonding material since it disperses readily in the alkali silicate solution and imparts better stability and consistency to the composition and promotes the retention of the solids in suspension and keeps the composition free from grittiness. The clay also improves the bonding of the composition with surfaces to which the composition is applied and promotes the retention of the alkali silicate in a surface film, thereby providing a more substantial bonding layer. It is preferable to employ a kaolinitic clay or other non-swelling clay. A sedimentary kaolinitic clay has been found to be suitable. An air-float clay is also suitable. Clays of the montmorillonite type are likewise suitable. It is desirable that the clay be present so that the ratio by dry weight of the clay to the alkali silicates is between about 1 to 20 and about 1 to 2, and preferably so that the ratio is between about 1 to 12 and about 1 to 4.

In the fabrication of the composite board-like materials, any fibrous sheet material may be employed. Preferably the fibrous sheet material is bibulous and in the fabrication of composite boards according to this invention it is especially desirable to employ bibulous sheet material that is capable of absorbing water to the extent of at least 50% by weight of the dry fibrous sheet material when the fibrous sheet material is immersed in water at 77° F. for about one minute, for in this way the cementitious bonding material is partially absorbed into the sheet material and hardens in situ after it has penetrated substantially into the sheet material. It is likewise preferable that the sheet material be substantially non-water repellent, namely, that the sheet material not contain a water-repellent material of a waxy, resinous or oily character in an amount that prevents pentration of the cementitious bonding composition a substantial distance into the sheet material.

The fibers in the fibrous sheet material may be vegetable or animal fibers, such as ordinary cellulosic fibers, felts comprising a substantial proportion of fiberized rags or the like. Such fibers can be made of increased heat- and fire-resistance by treating them with non-combustible or combustion-retarding materials such as chlorinated naphthalene, chlorinated paraffin, chlorinated diphenyl, chlorinated rubber, synthetic chlorine-containing elastomers, such as polychloroprene (chloro-butadiene), soluble phosphates, borates, sulphamates and the like. Fibers which have been so treated and are resistant to heat, but when subjected to high temperatures will char and smoke, are regarded as heat-resistant. Asbestos fibers, as pointed out below, are both heat- and fire-resistant. It is desirable that the fibers in the fibrous sheet material consist to the extent of at least 75% by weight of heat-resistant fibers and that the composite board as a whole, including any binder contained therein, contain at least about 90% by weight of the heat-resistant material.

When particularly high resistance to moisture and to heat is desired, it is preferable to employ fibrous sheet material in the form of asbestos paper, felt or the like. Asbestos paper often contains some sulphite fiber or newsprint, but usually this is less than 10% by weight of the fiber in the paper. More generally, for fire resistance the fibrous sheet material should consist in major proportion of asbestiform mineral fibers and preferably at least about 80% by weight of the fiber should be asbestiform mineral fiber. In lieu of asbestos fibers a mineral fiber such as rock wool or slag wool or glass fibers may be employed, but such materials tend to break down during processing and ordinarily are not suitable except in relatively small amount in conjunction with asbestos fiber. Accordingly, any such fibers are regarded as the equivalent of asbestos fibers and, when reference is made to asbestiform mineral fibers, any fibers of rock wool, slag wool, glass wool or the like are to be regarded as comprised in the asbestiform mineral fiber. Such mineral fibers are, as well as the essentially inorganic cementitious bonding material, non-combustible, and likewise do not give off smoke or char upon exposure to fire, and such materials, as well as other materials having similar characteristics, are "fire-resistant" as this term is used herein and in the claims. For many purposes, such as use of the composite board for heat insulation, etc., it is desirable that at least 90% and preferably substantially all, of the composite board consist of fire-resistant material.

In the manufacture of asbestos paper it is usually desirable to employ a preliminary binder so as to impart sufficient strength to enable handling and manipulation of the paper. It is standard practice to employ starch as the preliminary binder although other binder materials, particularly those known as "wet strength" resins, may be employed, such as urea-aldehyde resins, phenol-aldehyde resins, and the like. In addition, melamine resins, vinylidine resins, vinyl acetate, vinyl chloride, etc., are suitable, as well as various proteinaceous binders. When high heat-resistance is desired, the use of such organic and non-heat and non-fire resistant materials as a preliminary binder is preferably held down to a minimum.

While organic binders may be used to some extent as preliminary binder material for the fibrous sheet material that is used in making composite board according to this invention, there are several advantages in using clay as part or all of the temporary binder of a fibrous sheet material. The use of clay not only is advantageous due to its non-combustibility, but also is advantageous in that it has an insolubilizing effect upon any soluble silicate that penetrates into the paper. When alkali silicate solution is in admixture with a calcareous hydraulic cement, the silicate solution tends to be absorbed more deeply into the sheet material than the cement and is thereby carried outside of the zone where the insolubilizing agent is present. When clay is incorporated in the paper, any such alkali silicate that is carried into the paper is subjected to the insolubilizing action of the clay, which is advantageous.

In the fabrication of composite board-like products in the practice of this invention, it is ordinarily desirable to utilize fibrous sheet materials which weigh about 4 to 15 pounds per 100 square feet and it is usually preferable to use fibrous sheet material weighing about 7 to 12 pounds per 100 sq. ft. It is preferable when the sheet material is bibulous in character that the composite board as a whole contain from 10% to 30% by dry weight of the cementitious bonding material and it is preferable that the composite board contain from 12% to 24% by dry weight of the cementitious bonding material, thereby providing a thoroughly integrated product.

In the fabrication of composite board-like products, the different plies or layers of the fibrous sheet material are adhered together with the cementitious bonding material at the interfaces. The cementitious bonding material as applied to the fibrous sheet material is ordinarily made up so that it will have a viscosity of about 300 centipoises to about 1500 centipoises at 77° F. The consistency of the cementitious bonding material, as measured by its viscosity, depends to some extent upon the character of the fibrous sheet material that is used in the composite board. In the case of bibulous fibrous sheets, it is preferable that the cementitious bonding material as applied have a viscosity of about 400 centipoises to about 900 centipoises at 77° F. In this connection it may be pointed out that the composition of the cementitious bonding material depends to a certain extent upon the method of fabrication that is employed in making the composite board. Those compositions having the lower range of potassium silicate are especially desirable when the composite board is shaped during the fabrication thereof and a relatively high adhesive bond is desired in order to keep the plies or layers of the composite board from separating during fabrication. When, however, flat board-like bodies are fabricated, and the plies can readily be kept pressed together, as by a platen press, during the initial setting of the cementitious bonding material in the composite board, those compositions that are relatively high in potassium silicate can be employed since under such circumstances a lesser degree of initial adhesiveness is adequate.

After the cementitious bonding material has been applied and the composite board has been fabricated, the cementitious bonding material, upon drying, becomes hardened and a rigid, strong board-like product is afforded. In order to accelerate the insolubilization of the alkali silicate, it is desirable to heat the fabricated board to at least 200° F. and preferably to at least 275° F. or higher. The heating should be of sufficient duration to bring the center plies of the product up to the desired curing temperature so that all parts of the product will attain such temperature. This usually takes about 2 hours exposure to the particular curing temperature. When the product contains organic material such as an organic binder (e. g. starch) or organic fibers, it is usually not desirable to heat the product to a temperature at which the organic material becomes decomposed or discolored. This varies with the amount and kind of organic material present, but usually such discoloration or decomposition begins to occur at temperatures of the order of 300° F. to 350° F. If the amount of organic material has been kept very low or has been eliminated, then the curing temperature can be accomplished at a considerably higher temperature, e. g., at temperatures of the order of 500° F. to 700° F. It has been mentioned above that the amount of organic material can be reduced or eliminated by the employment of clay as a prelinmiary binder to give asbestos paper sufficient strength to be handled. Alternatively, in asbestos paper, there can be commingled with the usual paper grades of asbestos fiber, the bulk of which run between 1/16 inch and 1/4 inch with a considerable quantity of shorter fibers, sufficient longer fibers to give the asbestos paper enough strength so that it can be handled even though it contains no preliminary binder material. For maximum fire-resistance, and likewise maximum water resistance and wet strength, it is preferable, in the practice of this invention, to employ asbestos paper which is substantially free of organic material, either fibrous in character or in the form of a preliminary binder for the fibers.

It is usually desirable, before subjecting the fabricated composite board to curing, to dry the lumber at atmospheric temperatures until it contains not more than about 10% of moisture.

Further objects, features and advantages of the invention and of the fabrication of composite board according to this invention are brought out in connection with the following description of certain illustrative embodiments of this invention which are shown in the accompanying drawings, wherein—

Figure 1:
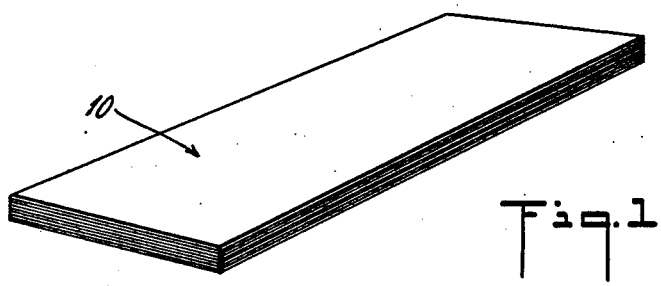
Fig. 1 is a perspective view of a typical piece of composite lumber embodying this invention.
Figure 2:
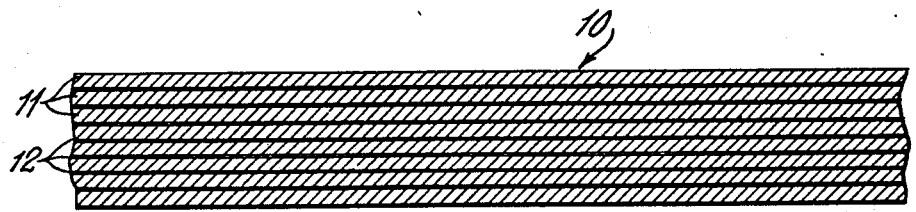
Fig. 2 is a cross-section of a portion of the composite lumber shown in Fig. 1.

Referring to Figs. 1 and 2, the composite lumber is indicated generally by the reference character 10 and is composed of a plurality of layers 11 of fibrous sheet material. Between the layers of fibrous sheet material is dispersed the cementitious bonding material 12.

By way of specific illustration the layers 11 of fibrous sheet material are in the form of asbestos paper sheets measuring about 4 feet by 8 feet and weighing about 8 pounds per 100 square feet. The asbestos paper consists essentially of asbestiform mineral fibers and contains about 4% by dry weight of starch as a preliminary binder.

In fabricating the composite lumber shown in Figs. 1 and 2, one of the layers of fibrous sheet material has applied thereto a cementitious binding material having the following composition.

|  | Grams |
|---|---|
| Sodium silicate solution, 42° Bé. | 75 |
| Potassium silicate solution, 28° Bé. | 25 |
| Portland cement | 43 |
| Clay | 6 |
| $Na_3PO_4$ | 8.5 |
| NaF | 3 |

After each layer has the cementitious bonding material, having a viscosity at 77° F. of about 600 centipoises, applied thereto, the next succeeding layer is deposited thereon and the layers are pressed together as by a platen press until the desired number of layers (in the embodiment shown 8 layers) have been built up. The cementitious bonding material is applied at such rate that the composite board will contain when dry about 18% by weight of the cementitious bonding material. After the board has been fabricated, it is subjected to pressure and permitted to stand until the cementitious composition takes its initial set. It is then dried at ordinary atmospheric pressure until the moisture content is reduced to about 8% by weight. It is then heated at 200° F. for 4 hours, and finally at 275° F. for 4 hours. The board as thus produced is then permitted to cool and can be trimmed to desired dimensions for the market. The product is a rigid, tough, board-like body having high resistance to heat and to moisture.

Figure 3:
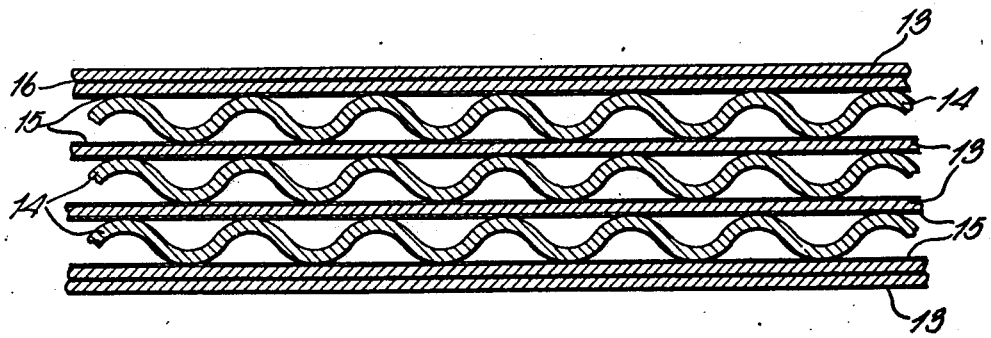
Fig. 3 is a cross-section, similar to Fig. 2, of an alternative type of composite lumber according to this invention.

In Fig. 3 an embodiment of composite board having a cellular construction is shown which makes the board desirable for its thermal insulation effectiveness as well as for its value as a structural material. The product is manufactured in essentially the same way that the embodiment shown in Figs. 1 and 2 is manufactured but contains in addition to the essentially flat or plane layers 13, the layers 14, which are corrugated. In the usual case a layer of asbestos paper or other sheet material is first passed through a corrugating roll, and then is caused to adhere to a plane layer that carries an applied coating 15 of the cementitious bonding material in a tacky and adhesive condition to provide a combination of a corrugated sheet and a plane sheet which is assembled, and dried to give it strength, before the combination is incorporated in the composite board as a whole. Alternatively, the adhesive can be applied to the crests of the corrugations for adhesion of the crests of the corrugations to a plane sheet to provide the prefabricated combination of a corrugated sheet with a plane sheet. The plane sheets are bonded together by the cementitious bonding material 16. The composite board may likewise be laid up layer by layer using the corrugated layers where desired as previously described. In lieu of corrugations, indentations or other deformations which provide a multiplicity of cells in the composite board as a whole may be employed.

In addition to the board products which are shown in the drawings, it is apparent that other board-like products can be made. Thus, the board, when initially made up, can be subjected to pressure in a press of curved or other irregular configuration so as to provide objects having any configuration desired. Alternatively, the sheet material may be wrapped about a suitable mandrel, the cementitious bonding material being applied as the sheet material is wrapped about the mandrel until the desired number of plies is obtained. By forming tubular bodies and then cutting them into semi-cylindrical sections, pipe coverings and the like may be afforded. Cellular board-like materials, such as shown in Fig. 3, are especially suitable for pipe coverings, for in most instances, some thermal heat insulating effect is desired.

While, in the embodiments shown, all of the plies have been shown as of the nature of asbestos paper or felt or of the nature of other bibulous papers or felts, this is not necessarily the case for one or more of the layers of the embodiments shown may be non-fibrous in character. Thus, this invention is adapted to the provision of fibrous, paper-like surfacing for gypsum sheets or boards or other non-fibrous, board-like sheets or for boards such as asbestos-cement boards which, while containing fibers, are not highly bibulous. However, this invention is primarily adapted to those board-like products wherein at least one of the layers or plies is a fibrous sheet which is bibulous, namely, will absorb at least 30% of water when immersed in water at 77° F. for about one minute.

The foregoing has been confined for the most part to a description of composite board-like products embodying this invention and the fabrication thereof according to this invention, and the critical limitations which are essential to the obtainment of the improvements and advantages of this invention have been fully set forth.

As mentioned above, if straight sodium silicate is employed one cannot obtain the combined properties of a workable adhesive and requisite insolubilization to provide a product of high wet strength even when an insolubilizing agent such as Portland cement is employed and even when very high curing temperatures of the order of 900° F. to 1000° F. are employed. On the other hand, employment of straight potassium silicate results in a product which has such a low degree of bonding between the plies that the plies scarcely stick together at all and may fall apart merely in the course of ordinary handling. By using a mixed alkali silicate composition, the sodium silicate and the potassium silicate modify each other so that good bonding and a high degree of insolubilization both may be obtained. If the limits as to relative amounts of sodium and potassium silicate are departed from there is either insufficient insolubilization or lack of proper bonding. Moreover, it may also be mentioned that the products of this invention not only have improved wet strength but also have improved strength when dry.

The relation of the total alkali silicate (sodium silicate plus potassium silicate) to the insolubilizing agent is likewise important since, under the practice of this invention, the insolubilizing agent is effective in amounts consistent with high alkali silicate content and good adhesiveness while at the same time affording a high degree of insolubilization of the alkali silicate. If the amount of insolubilizing agent is decreased too far, however, the resulting board product is lacking in wet strength.

It is also significant that the high degree of insolubilization of the alkali silicate is attained when only moderate curing temperatures are employed, namely, curing temperatures at which organic materials are not adversely affected.

In addition to the foregoing it is a further advantage of the practice of this invention that the drying of the board-like products is greatly facilitated and improved. By utilizing the cementitious bonding material composed within the critical limits aforesaid, the driving off of moisture is greatly facilitated and the tendency to form blisters and air pockets between the plies is greatly reduced. Moreover, the product can withstand accelerated drying by application of heat whereas such accelerated drying results in intumescense and blistering when ordinary sodium silicate adhesive is employed.

While this invention has been described in connection with certain typical examples of the practice thereof, it is to be understood that this has been done merely for illustrative purposes and that the scope of this invention is defined by the language of the following claims.

I claim:

1. In a fabricated composite board-like product comprising a plurality of layers of sheet material at least one of which consists of fibrous sheet material, a hardened and insolubilized cementitious bonding material which integrally unites said layers of sheet material including said layer of fibrous sheet material in the form of a rigid board-like body and which is composed predominantly of a mixture of alkali-silicate and calcareous hydraulic cement, the ratio (dry weight) of alkali silicate to hydraulic cement being between about 4 to 3 and about 1 to 2.5, said alkali silicate being a mixture of sodium silicate and potassium silicate and from 10% to 75% by dry weight of said alkali silicate consisting of potassium silicate.

2. In a fabricated composite board-like product comprising a plurality of layers of bibulous sheet material, a hardened and insolubilized cementitious bonding material which integrally unites said layers of bibulous sheet material in the form of a rigid board-like body and which is composed predominantly of a mixture of alkali silicate and calcareous hydraulic cement, the ratio (dry weight) of said alkali silicate to said calcareous hydraulic cement being between about 4 to 3 and about 1 to 2.5, said alkali silicate being a mixture of sodium silicate and potassium silicate and from 10% to 75% by dry weight of said alkali silicate consisting of potassium silicate, the ratio of $K_2O$ plus $Na_2O$ to $SiO_2$ being between about 1 to 2.5 and about 1 to 3.5, and said alkali silicate constituting about 30% to about 50% by dry weight of the total solids in said cementitious bonding material.

3. A fabricated composite board-like product which is moisture- and heat-resistant and which comprises a plurality of layers of fibrous sheet material which are composed predominantly of heat-resistant fibers and which are integrally united in the form of a rigid board-like body by a hardened and insolubilized cementitious bonding material composed predominantly of a mixture of alkali silicate and calcareous hydraulic cement, the ratio (dry weight) of alkali silicate to calcareous hydraulic cement being between about 1 to 1 and about 1 to 1.5, said alkali silicate being a mixture of sodium silicate and potassium silicate and from about 15% to about 60% by dry weight of said alkali silicate consisting of potassium silicate, and said alkali silicate constituting about 30% to about 50% by dry weight of the solids in said cementitious bonding material, said cementitious bonding material being disposed between and penetrating substantially into said layers and being insolubilized in situ by heat curing, said board-like product containing at least about 10% by dry weight of said cementitious bonding material.

4. In a fabricated composite board-like product comprising a plurality of layers of fibrous sheet material, a hardened and insolubilized cementitious bonding material which integrally unites said layers of fibrous sheet material in the form of a rigid board-like body and which is composed predominantly of a mixture of alkali silicate and calcareous hydraulic cement and containing clay, the ratio (dry weight) of alkali silicate to said hydraulic cement being between about 4 to 3 and about 1 to 2.5, said alkali silicate being a mixture of sodium silicate and potassium silicate and from 10% to 75% by dry weight of said alkali silicate consisting of potassium silicate, and the ratio of said clay to said alkali silicate being between about 1 to 20 and about 1 to 2.

5. In a fabricated composite board-like product comprising a plurality of layers of fibrous sheet material, a hardened cementitious bonding material which integrally unites said layers of fibrous sheet material in the form of a rigid board-like body and which comprises alkali silicate and clay, said alkali silicate being a mixture of sodium silicate and potassium silicate and from 10% to 75% by dry weight of said alkali silicate consisting of potassium silicate, the ratio of said clay to said alkali silicate being between about 1 to 20 and about 1 to 2, about 30% to about 50% of the dry weight of the total solids in said cementitious bonding material consisting of said alkali silicate, and the alkali silicate in said cementitious bonding material being insolubilized by heat curing in situ in the presence of said clay.

6. A fabricated composite board-like product which is highly resistant to heat and to moisture, which consists to the extent of at least 90% by dry weight of fire-resistant material and which comprises a plurality of layers of fibrous sheet material integrally united in the form of a rigid board-like body of a hardened and insolubilized cementitious bonding material composed predominantly of a mixture of alkali silicate and calcareous hydraulic cement, the ratio (dry weight) of alkali silicate to said calcareous hydraulic cement being between about 4 to 3 and about 1 to 2.5, said alkali silicate being a mixture of sodium silicate and potassium silicate and from 10% to 75% by dry weight of said alkali silicate consisting of potassium silicate, about 30% to about 50% by dry weight of said cementitious bonding material consisting of said alkali silicate, and said board containing from about 10% to about 25% by dry weight of said cementitious bonding material.

7. A fabricated composite board-like product according to claim 6 wherein at least 75% of the fibers in said fibrous sheet material are asbestiform mineral fibers.

8. In a fabricated composite board-like product which is highly resistant to heat and to moisture, which consists to the extent of at least 90% by dry weight of fire-resistant material and which comprises a plurality of layers of fibrous sheet material, a hardened and insolubilized cementitious bonding material which integrally unites said layers of fibrous sheet material in the form of a rigid board-like body and which is composed predominantly of a mixture of alkali silicate and calcareous hydraulic cement and which contains clay selected from the group consisting of kaolinitic type clay and montmorillonite type clay, the ratio (dry weight) of alkali silicate to said calcareous hydraulic cement being between about 4 to 3 and about 1 to 2.5, said alkali silicates being a mixture of sodium silicate and potassium silicate and from 10% to 75% by dry weight of said alkali silicate consisting of potassium silicate, about 30% to about 50% by dry weight of said cementitious bonding material consisting of alkali silicate, and the ratio (dry weight) of said clay to said alkali silicate being between about 1 to 20 and about 1 to 2.

HENRI M. MARC.

REFERENCES CITED

The following references are of record in the file of this patent:

UNITED STATES PATENTS

| Number | Name | Date |
|---|---|---|
| 1,606,051 | Bartlett | Nov. 9, 1926 |
| 1,610,203 | Covell | Dec. 7, 1926 |
| 1,676,727 | Carter | July 10, 1928 |
| 2,077,258 | Pitt et al. | Apr. 13, 1937 |
| 2,099,598 | Carter | Nov. 16, 1937 |
| 2,330,941 | Acuff | Oct. 5, 1943 |

FOREIGN PATENTS

| Number | Country | Date |
|---|---|---|
| 17,050 | Great Britain | 1801 |
| 9,892 | Great Britain | 1901 |
| 6,573 | Great Britain | Mar. 16, 1914 |
| 523,312 | Great Britain | July 11, 1940 |